United States Patent
Rothman et al.

(10) Patent No.: US 7,472,208 B2
(45) Date of Patent: Dec. 30, 2008

(54) BUS COMMUNICATION EMULATION

(75) Inventors: Michael A. Rothman, Puyallup, WA (US); Vincent J. Zimmer, Federal Way, WA (US)

(73) Assignee: Intel Corporation, Armonk, NY (US)

( * ) Notice: Subject to any disclaimer, the term of this patent is extended or adjusted under 35 U.S.C. 154(b) by 471 days.

(21) Appl. No.: 10/964,355

(22) Filed: Oct. 12, 2004

(65) Prior Publication Data
US 2006/0080579 A1    Apr. 13, 2006

(51) Int. Cl.
G06F 3/00   (2006.01)
G06F 9/44   (2006.01)
G06F 12/00  (2006.01)
G06F 15/167 (2006.01)

(52) U.S. Cl. .............. 710/36; 710/5; 710/20; 717/168; 711/147; 709/213

(58) Field of Classification Search .......... 717/168–170
See application file for complete search history.

(56) References Cited

U.S. PATENT DOCUMENTS 6,425,126 B1 * 7/2002 Branson et al. ............. 717/168
6,892,297 B1 * 5/2005 Aguilar et al. ............... 713/2
7,228,538 B1 * 6/2007 Burton et al. ............... 717/170

OTHER PUBLICATIONS

Wikipedia, "Message Queue", [online], revised Sep. 30, 2004, [retrieved on Oct. 25, 2007], retrieved from the Internet at <URL:http://en.wikipedia.org/w/index.php?title=Message_queue$oldid=7755432>, 2 pp.

* cited by examiner

Primary Examiner—Alan Chen
(74) Attorney, Agent, or Firm—Konrad Raynes & Victor LLP

(57) ABSTRACT

Provided are a method, system, and program for initializing a processor of a computer system, to enumerate a remote bus and remote devices coupled to the remote bus, as operating components of the computer system. In another embodiment, a controller stores a message containing a directive in a memory shared by a processor of a computer system and the controller which may be operated independently of the state of said processor and said operating system. The processor may read a message stored in the shared memory by the controller and process the message. In addition, the processor may store a message intended for the controller to provide, for example, status information to be forwarded to another computer system. Other embodiments are described and claimed.

38 Claims, 7 Drawing Sheets

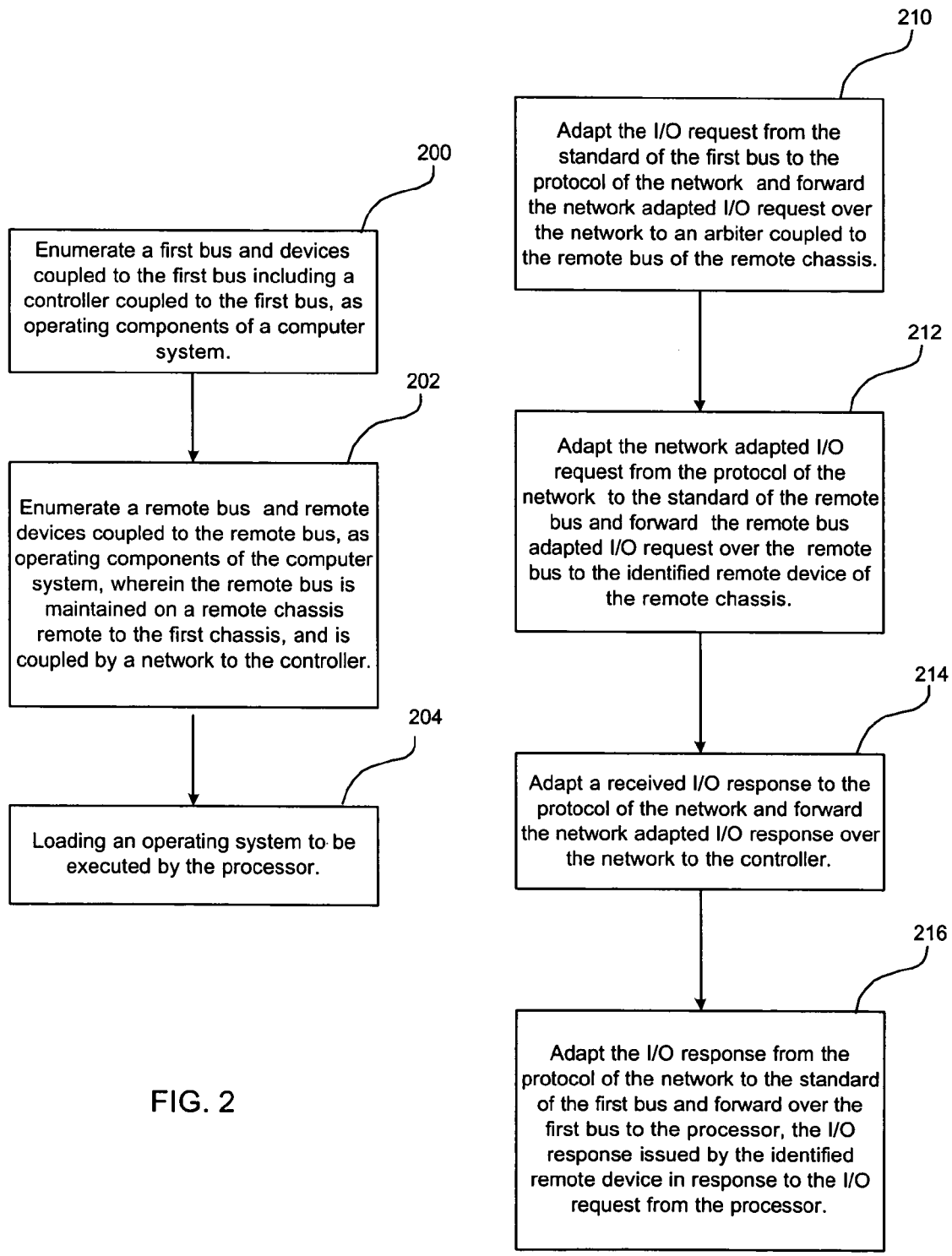

BUS COMMUNICATION EMULATION

BACKGROUND

A computer system may have a number of input/output (I/O) devices including video displays, speakers, printers, keyboards, pointing devices, and various ports including serial, parallel and network ports. The processor of the system typically communicates with the I/O devices via one or more peripheral busses which transmit control, address and data bits. One such bus frequently used is the Peripheral Component Interconnect, a local bus standard developed by Intel Corporation. There are other bus standards.

An I/O device is usually connected to the computer system bus using another I/O device referred to as an I/O controller or adapter, which facilitates communication between the system processor and another I/O device. For example, a video adapter for a video display device, typically includes memory to temporarily store display information, logic to process display information and interface circuitry to transfer information between the bus and the adapter and between the adapter and the video display. Other examples of I/O controllers for I/O devices include sound adapters, storage controllers, network controllers etc.

Some I/O controllers may include one or more integrated circuit chips which may be soldered or otherwise connected to a main circuit board such as a motherboard. Other I/O controllers may be carried on one or more expansion boards or cards, each of which has a number of connectors which are received in a connector socket often referred to as an expansion slot. The connector sockets are typically mounted on the main circuit board or motherboard.

The expansion slots are typically housed within the same chassis which houses or supports the main processor board of the computer system. However, additional expansion slots may be provided in an auxiliary chassis external to the main chassis. The peripheral bus of the expansion slots of the auxiliary chassis may extend between the main chassis and the auxiliary chassis and be coupled to the peripheral bus of the main chassis using a bus-to-bus bridge.

To ensure compatibility of a particular I/O controller with a particular computer system, the manufacturer of the I/O controller typically purchases or otherwise acquires use of the particular computer system and plugs the I/O device into an expansion slot of the particular computer or otherwise connects the I/O device to the motherboard of the computer system. To ensure wide compatibility, an I/O device controller manufacturer may obtain physical access to many different computer systems and physically attach the I/O device controller to each one in turn and test it. Conversely, a computer system manufacturer may purchase or otherwise acquire use of a wide range of I/O device controllers on the market and physically install each one in turn into its computer system to ensure adequate compatibility with those devices.

When a computer system is first turned on or restarted, the system processor which may include one or more central processing units (CPUs), initializes itself. In this initialization, the system processor looks up its first instruction in a startup program which is typically stored in non-volatile memory such as a read-only-memory (ROM). The startup program, among other tasks, typically takes an inventory of the various busses and the I/O devices coupled to the busses and checks the status of the devices to determine if the devices are working properly. Once the system processor has been initialized, an operating system is typically loaded from storage such as a hard drive in a boot sequence. The storage which contains a boot record which indicates to the system processor where to find the beginning of the operating system and the subsequent program file to initialize the operating system, is often referred to as the boot drive.

Upon initialization of the operating system, files of the operating system are copied into memory and the operating system typically takes over control of the boot process. At this point, the operating system often performs another inventory including an inventory of the I/O devices coupled to the bus and loads the appropriate drivers to control the I/O devices. The operating system may reserve portions of the system memory for use by the inventoried I/O devices.

Among the controllers which may be coupled to the bus, is an "out-of-band" controller which can operate independently of the system processor and the operating system controlling the system processor. The out-of-band controller may provide another user such as an administrator access to some of the computer system resources. For example, some servers and other computer systems may have a system management interrupt (SMI) which interrupts the operation of the system processor. Upon recognition of an SMI, the system processor may enter a system management mode in which information such as processor state information may be saved and other diagnostic operations may be performed. Some out-of-band controllers permit an administrator connected to the out-of-band controller by a network or other connection to assert an SMI to cause the system processor to enter a system management mode and permit the controller to forward information to the administrator.

BRIEF DESCRIPTION OF THE DRAWINGS

FIG. 2 illustrates an embodiment of operations to enumerate remote devices as operating components of a computer system.

FIG. 3 illustrates an embodiment of operations to adapt I/O requests and responses between a bus standard and a network protocol.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
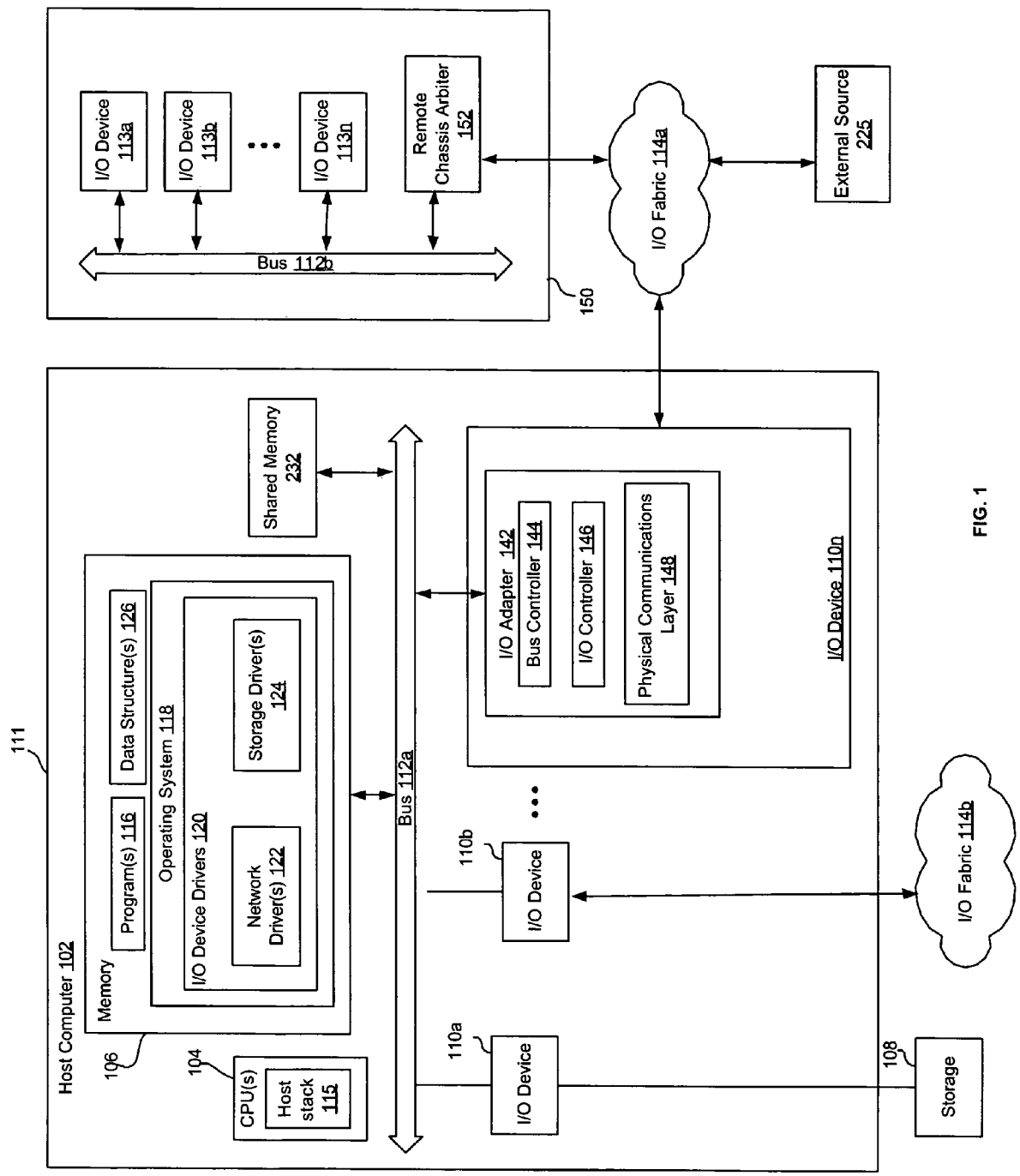
FIG. 1 illustrates an embodiment of a computing environment.

FIG. 1 illustrates a computing environment in which aspects of described embodiments may be employed. A host computer 102 includes one or more system processors or central processing units (CPUS) 104, a volatile memory 106 and an I/O device 108 which is, in this embodiment, a non-volatile storage 108 (e.g., magnetic disk drives, optical disk drives, a tape drive, etc.). The host computer 102 is coupled to one or more I/O devices 110a, 110b . . . 110n via one or more busses such as a local bus 112a, which is maintained on a board supported on a local chassis 111. In the illustrated embodiment, the I/O device 110a is a storage controller, the I/O device 110b is a network controller and the I/O device 110n is depicted as an out-of band controller. Any number of I/O devices 110a . . . 110n including video controllers, port adapters etc. may be attached to the local bus 112a of the host computer 102.

As explained in greater detail below, the out-of band controller 110n identifies to the CPU 104 of the host computer 102, a plurality of remote I/O devices 113a . . . 113n as being effectively coupled to the local bus 112a of the host computer 102. The I/O devices 113a . . . 113n are coupled to a remote bus 112b which in turn is coupled by the I/O fabric 114a to the out-of-band controller 110n which performs a bus-to-bus bridge function. As a consequence, when the host computer 102 boots, the I/O devices 113a . . . 113n may be recognized as a part of the host computer 102 in the same manner as the I/O devices 110a . . . 110n.

The host computer 102 uses I/O devices in performing I/O operations (e.g., network I/O operations, storage I/O operations, etc.). Thus, the I/O device 110a may be used as a storage controller for storage such as the storage 108, for example, which may be directly connected to the host computer 102 or may be connected by a network.

An I/O device such as a storage controller controls the reading of data from and the writing of data to the storage 108 in accordance with a storage protocol layer. The storage protocol may be any of a number of suitable storage protocols including Redundant Array of Independent Disks (RAID), High Speed Serialized Advanced Technology Attachment (SATA), parallel Small Computer System Interface (SCSI), serial attached SCSI, etc. Data being written to or read from the storage 108 may be cached in a cache in accordance with suitable caching techniques. The storage controller may be integrated into the CPU chipset, which can include various controllers including a system controller, peripheral controller, memory controller, hub controller, I/O bus controller, etc.

A host stack 115 executes on at least one CPU 104. A host stack may be described as software that includes programs, libraries, drivers, and an operating system that run on host processors (e.g., CPU 104) of a host computer 102. One or more programs 116 (e.g., host software, application programs, and/or other programs) and an operating system 118 reside in memory 106 during execution and execute on one or more CPUs 104.

The host computer 102 may comprise any suitable computing device, such as a mainframe, server, personal computer, workstation, laptop, handheld computer, telephony device, network appliance, virtualization device, storage controller, etc. Any suitable CPU 104 and operating system 118 may be used. Programs and data in memory 106 may be swapped between memory 106 and storage 108 as part of memory management operations.

Operating system 118 includes I/O device drivers 120. The I/O device drivers 120 include one or more network drivers 122 and one or more storage drivers 124 that reside in memory 106 during execution. The network drivers 122 and storage drivers 124 may be described as types of I/O device drivers 120. The I/O drivers 120 may also include drivers for one or more of the remote I/O devices 113a . . . 113n. Also, one or more data structures 126 are in memory 106.

Each I/O device driver 120 includes I/O device specific commands to communicate with an associated I/O device 10a . . . 110n, 113a . . . 113n and interfaces between the operating system 118, programs 116 and the associated I/O device 10a . . . 110n, 113a . . . 113n. The I/O devices 110a . . . 110n, 113a . . . 113n and I/O device drivers 120 employ logic to process I/O functions.

Each I/O device 110a . . . 110n, 113a . . . 113n includes various components implemented in the hardware of the I/O device 110a . . . 110n, 113a . . . 113n. The I/O devices 110b, 110n of the illustrated embodiment are each capable of transmitting and receiving data over an I/O fabric 114a, 114b. The I/O fabrics 114a, 114b may be the same or different, or separate or combined. Each I/O fabric 114a, 114b may comprise a Local Area Network (LAN), the Internet, a Wide Area Network (WAN), a Storage Area Network (SAN), WiFi (Institute of Electrical and Electronics Engineers (IEEE) 802.11b, published Sep. 16, 1999), Wireless LAN (IEEE 802.11b, published Sep. 16, 1999), etc.

Each I/O device 110a . . . 110n, 113a . . . 113n includes an I/O adapter 142, which in certain embodiments, is a Host Bus Adapter (HBA). In the illustrated embodiment, an I/O adapter 142 includes a bus controller 144, an I/O controller 146, and a physical communications layer 148. The bus controller 144 enables the I/O device 110a . . . 110n, 113a . . . 113n to communicate on a bus 112a, 112b which may comprise any suitable bus interface, such as any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 1.0a, published 2002), published March 2002), Small Computer System Interface (SCSI) (American National Standards Institute (ANSI) SCSI Controller Commands-2 (SCC-2) NCITS.318:1998), Serial ATA ((SATA) 1.0a Specification, published Feb. 4, 2003), etc or another type of peripheral bus.

The I/O controller 146 provides functions used to perform I/O functions. The physical communication layer 148 provides functionality to send and receive information over a network, or directly to and from an I/O device such as a storage device, a display, a printer, a keyboard, mouse etc. In the illustrated embodiment, the physical communication layer 148 of the network controller 110b and the out-of-band controller 110n send and receive network packets to and from remote devices or computer systems over an I/O fabric 114a, 114b. In certain embodiments, the I/O controller 146 may implement the Ethernet protocol (IEEE std. 802.3, published Mar. 8, 2002) over unshielded twisted pair cable, TCP/IP (Transmission Control Protocol/Internet Protocol), Remote Direct Memory Access (RDMA), token ring protocol, Fibre Channel (IETF RFC 3643, published December 2003), Infiniband, or any other suitable networking protocol. Details on the TCP protocol are described in "Internet Engineering Task Force (IETF) Request for Comments (RFC) 793," published September 1981, details on the IP protocol are described in "Internet Engineering Task Force (IETF) Request for Comments (RFC)" 791, published September 1981, and details on the RDMA protocol are described in the technology specification "Architectural Specifications for RDMA over TCP/IP" Version 1.0 (October 2003).

The I/O device 110n may be integrated into the CPU chipset, which can include various controllers including a system controller, peripheral controller, memory controller, hub controller, I/O bus controller, etc. Alternatively, the out-of-band controller 110n may comprise separate integrated circuits disposed on an expansion board which is connected to the local bus 112a in an expansion slot.

The I/O devices 110a . . . 110n, 113a . . . 113n may include additional hardware logic to perform additional operations.

For example, the I/O controller 146 of the devices 110b, 110n of the illustrated embodiment may each include a network protocol layer to send and receive network packets to and from remote devices over the I/O fabric 114a, 114b The I/O device 110b, 110n can control other protocol layers including a data link layer and the physical layer 148 which includes hardware such as a data transceiver.

In the illustrated embodiment, the remote bus 112b and the remote I/O devices 113a . . . 113n are supported by a remote chassis 150 which is separate from the local chassis 111. The chassis 111, 150 may be separated by a short distance such as a few meters, for example, or by a long distance such as thousands of kilometers, for example.

FIG. 2 illustrates an example of operations of a system processor, such as the CPU 104 of the host computer 102, and operations of a controller, such as the out-of band controller 110n, which permit the remote I/O devices 113a . . . 113n to be recognized and used by the CPU 104 as a part of the host computer 102 in the same manner as the local I/O devices 110a . . . 110n. In one application, the remote I/O devices 113a . . . 113n may be tested and operated without connecting them within the local chassis 111. Other applications are of course suitable, depending upon the particular circumstances.

Upon turning on or restarting the host computer 102, the CPU 104 initializes itself. In this initialization, the CPU 104 looks up an initial instruction in a startup program which is typically stored in non-volatile portion of the host memory 106. The startup program, among other tasks, typically takes an inventory of the busses and the various I/O devices coupled to the busses and checks the status of the devices to determine if the devices are working properly. This taking of inventory is often referred to as "bus enumeration."

In the embodiment of FIG. 2, the CPU 104 as instructed by a start-up program, enumerates (block 200) the local bus 112a and the I/O devices 110a, 110b . . . 110n coupled to the local bus 112a, as operating components of the host computer 102. In this bus enumeration process, the CPU 104 may issue commands which query the local bus 112a and the I/O devices 110a, 110b . . . 110n coupled to the local bus 112a. In response to these queries, the CPU 104 may read back information describing the identity and status of the various devices. In addition, the CPU may assign the local bus 112a and the I/O devices 110a, 110b . . . 110n identification numbers, such as a bus number, a device number and a function number, which identify each bus, each device coupled to each bus and individual functions of each device.

In this embodiment, one of the I/O devices enumerated by the CPU 104 is the controller 110n which, in this example, emulates a bus-to-bus bridge device. The CPU 104 recognizing the controller 110n as a bus-to-bus bridge device, also enumerates (block 202) the remote bus 112b and the remote I/O devices 113a, 113b . . . 113n coupled to the remote bus 112b, as operating components of the host computer 102. This is achieved notwithstanding that the bus 112b is a remote bus maintained on a remote chassis 150 coupled by a network such as the I/O fabric 114a. The fact that the remote bus 112b and its associated remote I/O devices 113a . . . 113n may be separated by meters or kilometers from the local bus 112a is transparent to the CPU 104.

In this further bus enumeration process, the CPU 104 may issue commands over the local bus 112a, and the commands are forwarded by the controller 110n over the I/O fabric 114a to the remote chassis 150, to query the remote bus 112b and the remote I/O devices 113a, 113b . . . 113n coupled to the remote bus 112b. In response to these queries, the CPU 104 may read back information describing the identity and status of the remote bus 112b and the various other devices 113a . . . 113n. This identity and status information may be forwarded by the controller 110n from the I/O fabric 114a to the CPU 104.

In addition, the CPU may assign the remote bus 112b and the Remote I/O devices 113a, 113b . . . 113n identification numbers, such as a bus number, a device number and a function number, in the same manner as the local bus 112a, and local I/O devices 110a . . . 110n. Thus, for example, the CPU 104 may assign local bus 112a bus identification number "001" and may assign remote bus 112b bus identification number "002" such that the busses 112a, 112b are each uniquely identified as being an operating component of the host computer 102.

In the illustrated embodiment, once the CPU 104 has initialized, the operating system 118 may be loaded (block 204) into memory 106 from storage such as the storage 108 in a boot sequence. The storage 108 may contain a boot record which indicates to the CPU 104 where to find the beginning of the operating system 108 and a subsequent program file to initialize the operating system 118.

Files of the operating system 118 may be copied from the storage 108 into the memory 106 and the operating system 118 may take over control of the boot process. At this point, the operating system 118 may perform another inventory including an inventory of the busses 112a, 112b, and the I/O devices 110a . . . 110n, 113a . . . 113n coupled to the buses 11a, 112b and load the appropriate drivers 120 to control the busses 112a, 112b and the I/O devices 110a . . . 110n, 113a . . . 113n. In addition, the operating system 118 may reserve portions of the memory 106 for use by one or more of the I/O devices 110a . . . 110n, 113a . . . 113n coupled to the buses 11a, 112b.

Once the operating system 118 and the drivers 120 are loaded, the CPU 104 can issue I/O requests to the remote I/O devices 113a . . . 113n as operating components of the host computer 102. For example, if the remote I/O device 113a is a network controller coupled to the Internet, the CPU 104 controlled by a web browser program 116, can issue an I/O request to the remote network controller 113a of the remote chassis 150 to load a web page from the Internet into the local memory 106 for viewing on a local display coupled by a local display adapter of the local I/O devices 110a . . . 110n.

FIG. 3 illustrates an example of operations of the controller 110n and an arbiter 152 of the remote chassis 150 to forward I/O requests and responses between the CPU 104 and the remote I/O devices 113a . . . 113n of the remote chassis 150. Once the CPU 104 issues over the local bus 112a, an I/O request directed to a bus enumerated remote I/O device of the remote I/O devices 113a . . . 113n, the controller 110n adapts (block 210) the I/O request from the standard of the local bus 112a to the protocol of the I/O fabric 114a. In this example, the standard of the local bus 112a is a PCI standard and the protocol of the I/O fabric 114a is the TCP/IP protocol for network communications through the Internet and in some applications for communications through other types of networks such as LAN, WAN etc. It is appreciated that other bus standards and other network protocols may be used as well.

In performing this adaptation, the controller 110n functions as a bus-to-bus bridge, and intercepts the I/O request issued by the CPU 104 on the local bus 112a. The controller 110n also establishes a connection with the remote chassis arbiter 150 over the I/O fabric 114a in accordance with the TCP/IP protocol. In addition, the controller 110n packages the I/O request in one or more appropriate data packets in accordance with the TCP/IP protocol. Functioning as a network controller, the controller 110a forwards the data packet or packets containing the network adapted I/O request to the remote chassis arbiter 152. The controller 110*n* may include an offload engine such as a TCP/IP offload engine (TOE) to facilitate one or more of these tasks. Portions of these tasks may also be performed by one or more drivers 120.

Upon receipt of the data packets, the remote chassis arbiter 152 adapts (block 212) the network adapted I/O request contained with the received data packets, from the TCP/IP protocol of the I/O fabric 114*a*, to the standard of the remote bus 112*b*. In this embodiment, the bus standard of the remote bus 112*b* is a PCI bus standard, the same as that of the local bus 112*a* of the local chassis 111. It is appreciated that other bus standards may be utilized for the remote bus 112*b* and that the standards for the local and remote busses 112*a*, 112*b* may be the same or different.

The remote chassis arbiter 152 also forwards (block 212) the remote bus adapted I/O request over the remote bus 112*b* to the I/O device of the remote I/O devices 113*a* . . . 113*n* identified by the I/O request from the CPU 104. In this embodiment, the format of the I/O request from the CPU 104 on the remote bus 112*b* is the same as if it had passed from the local bus 112*a*, through a standard PCI-to-PCI bridge to another local bus connected directly to the bridge.

In this example, the I/O request is a request to load a web page from the Internet and is directed to remote I/O device 113*a* which is a network controller in this example. Accordingly, in response to the I/O request, the remote network controller 113*a* fetches the web page data from the Internet and returns the requested data on the remote bus 112*b* in the form of an I/O response.

The remote chassis arbiter 152 receives the I/O response from the remote network controller 113*a* over the remote bus 112*b* and adapts (block 214) the received I/O response from the standard of the remote bus 112*b* to the protocol of the network of the I/O fabric 114*a*. As previously mentioned, in this example, the protocol of the I/O fabric 114*a* is the TCP/IP protocol for network communications through the Internet.

In performing this adaptation, the arbiter 152 packages the I/O response in one or more appropriate data packets in accordance with the TCP/IP protocol. Functioning as a network controller, the arbiter forwards the data packet or packets containing the network adapted I/O response to the controller 110*n*. The arbiter 152 may establish a connection with the controller 110*n* over the I/O fabric 114*a* in accordance with the TCP/IP protocol or may utilize the connection previously established by the controller 110*n* in sending the original I/O request.

Upon receipt of the data packets, the controller 110*n* adapts (block 216) the network adapted I/O response contained with the received data packets, from the TCP/IP protocol of the I/O fabric 114*a*, to the standard of the local bus 112*a*, which in this embodiment is a PCI standard. The controller 110*n*, functioning as a PCI-to-PCI bridge, also forwards (block 216) the local bus adapted I/O response over the local I/O 112*a* to the CPU 104. In this embodiment, the format of the I/O response from the remote I/O device 113*a* to the CPU 104 on the local bus 112*a* is the same as if it had passed from one local bus direct to another local bus (the local bus 112*a*) via a standard PCI-to-PCI bridge. In the example where the I/O response is web page data fetched from the Internet, the CPU 104 can display the web page obtained by the remote controller 113*a* on a local display coupled by a local display adapter of the local I/O devices 110*a* . . . 110*n*.

In a similar fashion, during bus enumeration, the controller 110*n* may be operated to adapt enumeration commands from the CPU 104 from the standard of the local bus 112*a* to the protocol of the I/O fabric 114*a* and the arbiter 152 may be operated to adapt the network adapted enumeration commands from the protocol of the I/O fabric 114*a* to the bus standard of the remote bus 112*b*. Conversely, responses from the remote bus 112*b* and the remote devices 113*a* . . . 113*n* during bus enumeration may be adapted by the arbiter 152 from the bus standard of the remote bus 112*b* to the protocol of the I/O fabric 114*a* and the controller 110*n* may be operated to adapt the network adapted responses from the protocol of the I/O fabric 114*a* to the bus standard of the local bus 1112*a*.

Figures 4, 5:
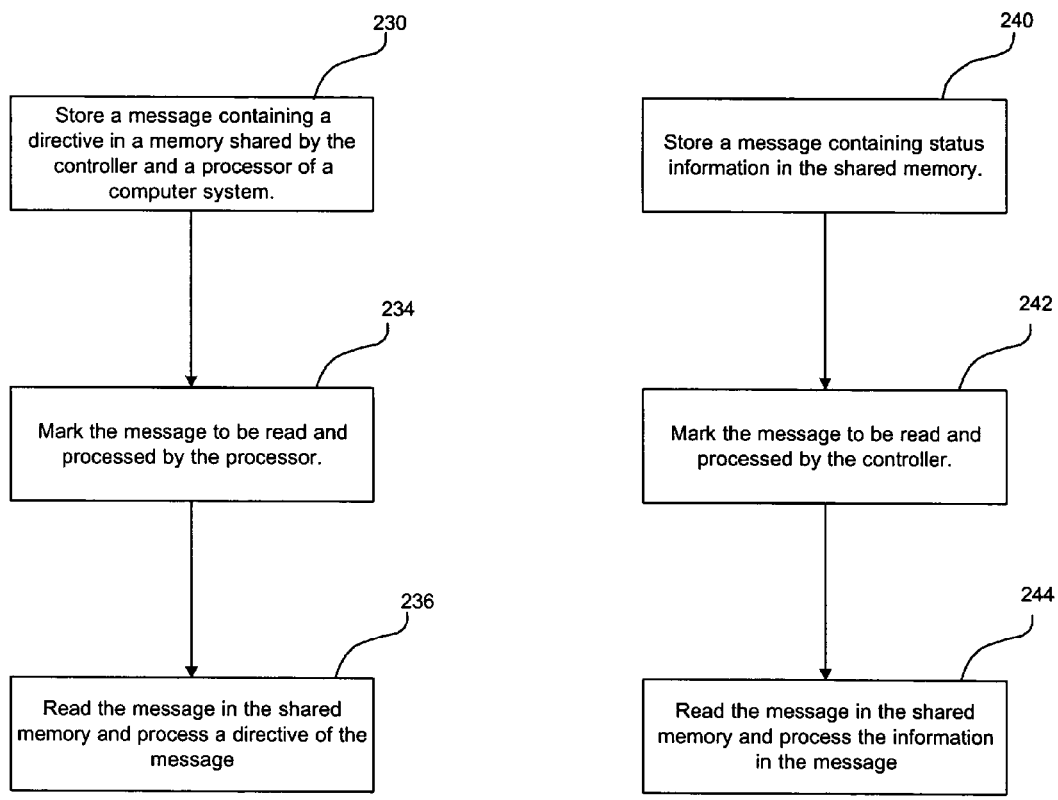
FIGS. 4 and 5 illustrate an embodiment of operations to store and process messages between a system processor and a controller, using a shared memory.

FIGS. 4 and 5 illustrate an example of operations of the controller 110*n* and the CPU 104 to facilitate communication between the controller 110*n* and the CPU 104 independent of the state of the CPU 104. As explained below, messages containing directives to the host computer 102 may be posted by the controller 1 on for a number of activities such as firmware updates, operating system updates, driver updates, retrieval of information such as software version data, etc. Directives may be forwarded from external sources 225 (FIG. 1) such as servers, peer-to-peer communications, administrator workstations, etc. Information retrieved in response to directives may be obtained from a variety of sources including firmware, operating systems, drivers, applications, etc., and forwarded to external targets or sources.

The controller 110*n* may be operated to store (block 230) a "message" containing a directive in a memory shared by the controller 110*n* and a processor of the computer system such as the CPU 104 of the host computer 102. In the illustrated embodiment, the host computer 102 includes a shared memory 232 which is accessible by both the CPU 104 and the controller 110*n*. The shared memory 232 may be operated as a mailbox for these messages. Thus, in one aspect, the controller 110*n* may store a message in the shared memory 232 or retrieve a message from the shared memory 232, independently of the status of the host computer 102 including the status of the CPU 104, the operating system 118 and the programs 116. Thus, in the illustrated embodiment, the controller 110*n* may store or retrieve messages in the shared memory 232 whether the CPU 104 is being initialized or is turned off, or whether the operating system 118 is booting, running, crashed or otherwise.

To facilitate such independent operation, in this example, the controller 110*n*, the shared memory 232, the local bus 112*a* and other components as appropriate may be powered independently of the main components of the host computer 102 including the CPU 104 and the host memory 106. The shared memory 232 may be non-volatile memory such as flash memory or static random access memory (SRAM). In addition, the controller 110*n* may be an out-of-band controller operated independently of the operating system 118 or system start-up program, such that the controller 110*n* may have its own dedicated control circuitry, firmware, operating system, etc to control the operations of the controller 110*n* independently of the status of the remainder of the host computer 102. It is appreciated that the degree of operational independence, if any, of the controller 110*n* and other components may vary, depending upon the particular application.

In the illustrated embodiment, the shared memory 232 may be a persistent, reserved portion of the storage 108 or a separate non-volatile memory. Accordingly, the memory safety of the operating system 118 can be maintained. For example, the controller 110*n* may avoid direct memory access operations into the main host memory 106.

A message intended for the CPU 104 may be marked (block 234) to be read and processed by the CPU 104. The marking may occur before, during or after the message is actually stored in the shared memory 232.

The CPU 104, when operational, may read (block 236) the message stored in the shared memory 232 and marked as intended for the CPU 104, and process any directive contained within the message. As previously mentioned, the directive may direct the CPU 104 to undertake any of a number of activities including updating firmware, drivers, operating system, or applications, applying patches, applying interrupts, retrieving information, etc.

Conversely, a system processor such as the CPU 104 of the host computer 102 may store (block 240, FIG. 5) a message in the shared memory 232. The storing of a message by the system processor may be in response to a directive contained in a message from the controller 110n, which was read from the shared memory 232 (block 234) and processed by the CPU 104. The directive from the controller may have included instructions to retrieve certain information such as, for example, data describing the version of an application 116 of the host computer 102. This information may be packaged into a message which is stored by the CPU 104 into the shared memory 232.

A message intended for the controller 110n may be marked (block 242) to be read and processed by the controller 110n. The marking may occur before, during or after the message is actually stored in the shared memory 232. A message so marked may be read (block 244) by the controller 110n from the shared memory 232 and any directive or information contained within the message may be processed. For example, information contained within the message may be forwarded to an external source such as an administrator workstation, a second computer system, a server, or other external source.

Figure 6:
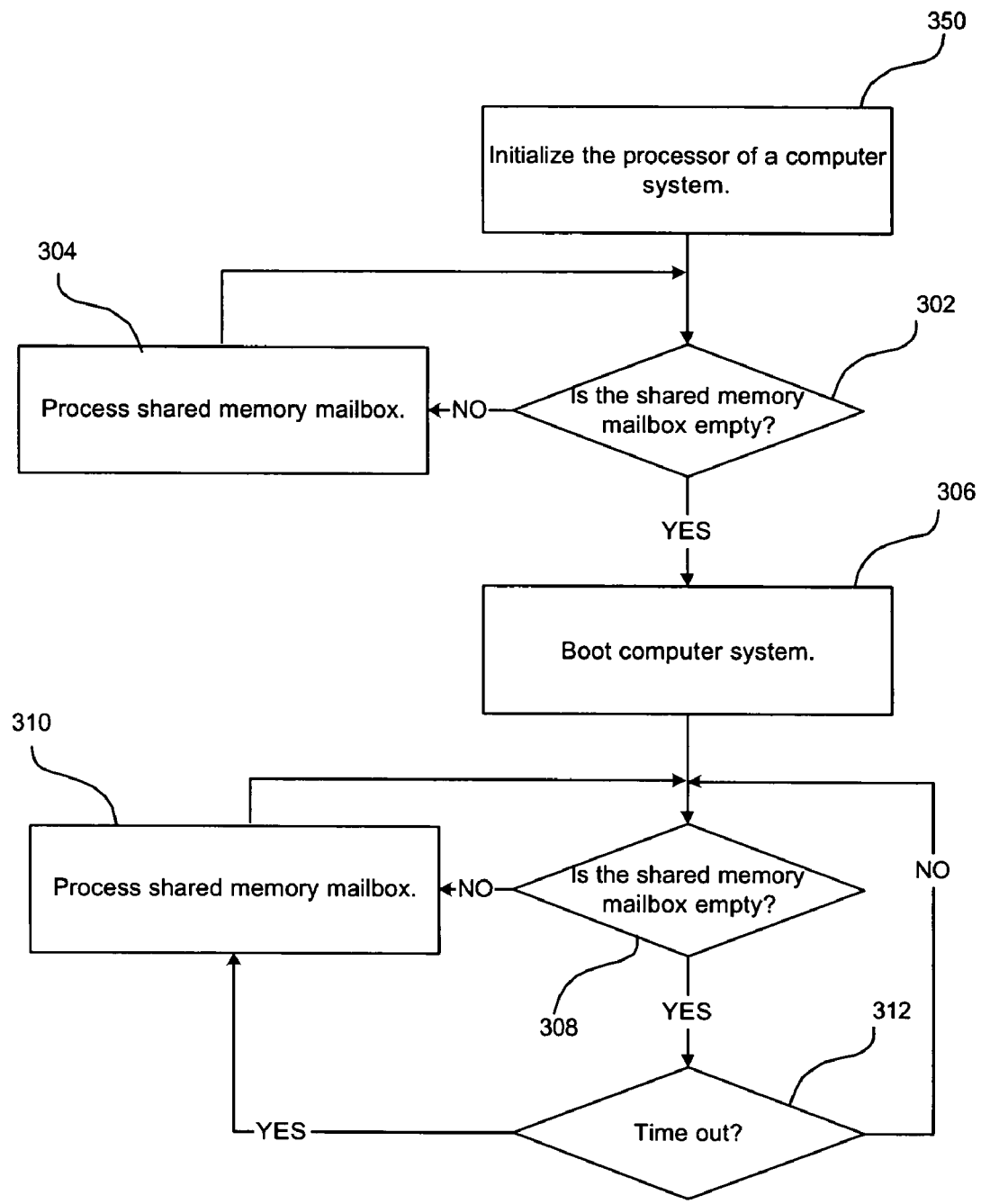
FIGS. 6 and 7 illustrate a more detailed embodiment of operations to store and process messages between a system processor and a controller, using a shared memory.

FIG. 6 illustrates an example of operations of a system processor such as the CPU 104 of the host computer 102 reading and processing messages from the shared memory 232 at various states of the host computer 102. Upon starting up or restarting the host computer 102, the CPU 104 may be initialized (block 300). In this initialization, a watchdog timer may be set. A determination may be made (block 302) as to whether a shared memory mailbox such as the shared memory 232 is empty. If not, that is, the shared memory contains messages, the messages may be read and processed (block 304) by the CPU 104.

This determination (block 302) may occur one or more times including during initialization of the CPU 104, and also after initialization of the CPU 104 and prior to booting (block 306) the computer system such as the host computer 102. Thus, a message read during initialization, for example, may contain, for example, a directive to the CPU 104 to retrieve status information for one or more components of the host computer 102 during the initialization process but prior to booting the host computer 102. If so, the CPU 104 can retrieve the specified information and store it in a message marked for the controller 110n in the shared memory 232.

Upon processing (block 304) the shared memory 232, and determining that the shared memory 232 is empty (block 302) of additional messages to be processed by the CPU 104, the host computer 102 may be booted (block 306) which includes loading the operating system 118. Another determination may be made (block 308) as to whether a shared memory mailbox such as the shared memory 232 is empty. If not, that is, the shared memory contains messages, the messages may be read and processed (block 310) by the CPU 104.

This subsequent determination (block 308) may occur one or more times including during booting of the operating system 118, and also after loading of the operating system 118 is completed for the host computer 102. Thus, a message read during booting, for example, may contain, for example, a directive to the CPU 104 to update a driver 120 for one or more components of the host computer 102 during the boot process for the host computer 102.

As previously mentioned, a watchdog timer may be set which upon expiration (block 312), can also cause the shared memory 232 to be processed (block 310). For example, the watchdog timer may be periodically reset. Failure of the CPU 104 to reset the watchdog timer may indicate an unexpected mode of operation of the CPU 104. Accordingly, if the watchdog timer is not reset and is allowed to expire, the CPU 104 can be interrupted and instructed to process (block 310) the shared memory 232.

If the watchdog timer does not expire, a check may be made (block 308) again as to whether the shared memory mailbox such as the shared memory 232 is empty. Thus, a loop may be set up in which the shared memory 232 is periodically processed, even after the operating system is loaded and running applications 116.

Figure 7:
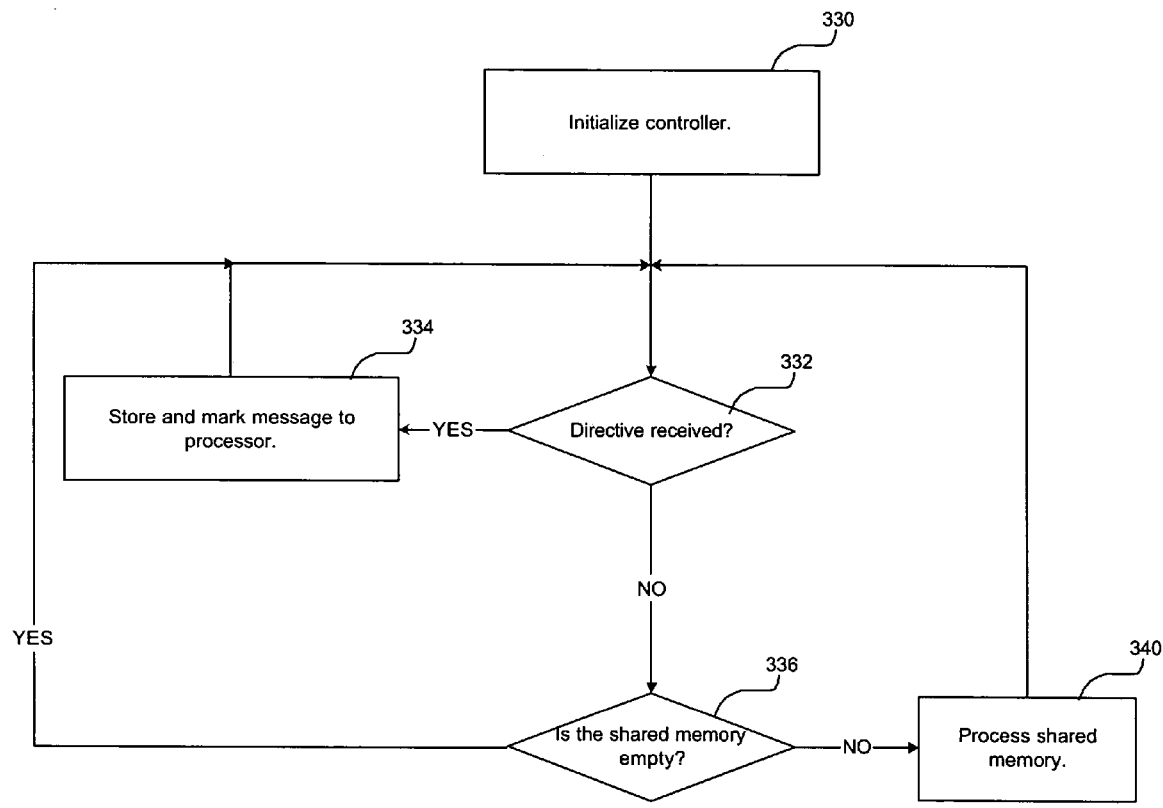

FIG. 7 illustrates an example of operations of a controller such as the controller 10n storing and reading messages in the shared memory 232 at various states of the controller 110n. Upon starting up or restarting the controller 110n, the controller 110n may be initialized (block 330). A determination may be made (block 332) as to whether a directive was received from an external source 225 such as an administrator workstation, for example. In some instances, directives may be generated and received internally by the controller 110n. A received directive may be intended for the CPU 104. If so, the directive may be packaged into a message and stored (block 334) in the shared memory 232. In addition, the message may be marked as a message to be read and processed by the CPU 104.

This determination (block 332) may occur one or more times including during initialization of the controller 110n, and also after initialization of the controller 110n. Thus, a message stored during initialization, for example, may contain, for example, a directive to the CPU 104 to retrieve status information for one or more components of the host computer 102.

As previously mentioned, the controller 110n may store messages intended for the CPU 104 independently of the status of the host computer 102 including the status of the CPU 104, the operating system 118 and the programs 116. Thus, in the illustrated embodiment, the controller 110n may store or retrieve messages in the shared memory 232 whether the CPU 104 is being initialized or is turned off, or whether the operating system 118 is booting, running, crashed or otherwise.

Upon storing (block 334) any messages containing directives to the CPU 104 in the shared memory 232, a determination (block 336) is made as to whether the shared memory 232 contains messages intended for the controller 110n. If so, the messages may be read and processed (block 340) by the controller 110n. For example, the shared memory may contain a message from the CPU 104 containing status data requested by a directive previously placed in the form of a message in the shared memory 232 by the controller 110n. If so, the status data read from the message can be forwarded by the controller 110n, over the I/O fabric 114a, to the external source 225 which provided the original directive requesting the status information.

Once any messages directed to the controller 110n have been read and processed by the controller 110n, or it is determined (block 336) that the shared memory 232 does contain messages intended for the controller 110n, a check (block 332) may be made again for additional directives received.

Thus, a loop may be set up in which the shared memory 232 is periodically checked for messages intended for the controller 110n and processed, a and a check is periodically made for the receipt of directives.

Figures 8, 9:
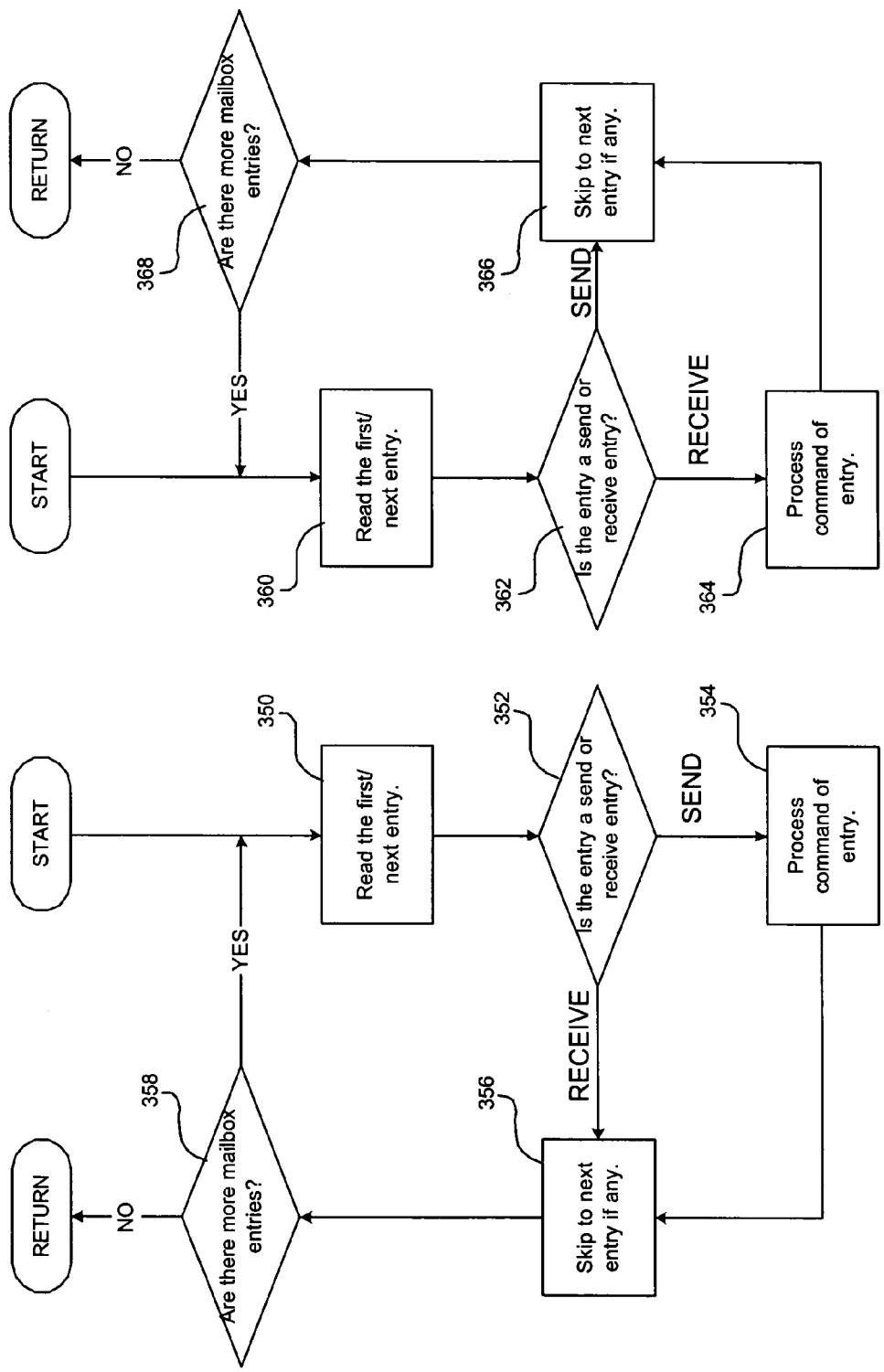
FIGS. 8 and 9 illustrate a more detailed embodiment of operations by a system processor and a controller to process messages stored in a shared memory.

FIG. 8 is a more detailed example of operations of a system processor such as the CPU 104 to process a shared memory. Upon being called in an operation such as an operation 304, 310 (FIG. 6), the CPU 104 may read (block 350) the first entry stored in the shared memory 232. A determination (block 352) may be made as to whether the entry is intended for the CPU 104 or for the controller 110n. In this example, an entry intended for the CPU 104 is designated a "send" entry. Conversely, an entry intended for the controller 110n is designated a "receive" entry. It is appreciated of course that other designations may be used as well.

If the entry is a send entry, the directive of the message stored as the send entry in the shared memory is processed (block 354) by the CPU 104. The processing of a directive may include fetching information requested by the directive and storing a return message as a "receive" entry in the shared memory 232. Upon processing the stored send entry, the send entry may be deleted from the shared memory or otherwise marked as processed. In addition, processing of the shared memory entries may skip (block 356) to the next entry, if any, of the shared memory 232. If it is determined (block 358) that there are no remaining entries to be processed, operations of the CPU 104 may resume as provided in the example of FIG. 6. Conversely, if it is determined that additional shared memory entries remain to be processed, the next entry may be read (block 350) and processed as appropriate.

If it is determined (block 352) that a read entry is intended for the controller 110n, that is, the entry is a "receive" entry, processing of the shared memory entries may again skip (block 356) to the next entry, if any, of the shared memory 232.

FIG. 9 is a more detailed example of operations of a controller such as the controller 110n to process a shared memory. The operations of FIG. 9 are similar to the operations of FIG. 8. Thus, upon being called in an operation such as an operation 334 (FIG. 7), the controller 110n may read (block 360) a first entry stored in the shared memory 232. A determination (block 362) may be made as to whether the entry is intended for the controller 110n or for the CPU 104. As previously mentioned, in this example, an entry intended for the CPU 104 is designated a "Send" entry and an entry intended for the controller 110n is designated a "Receive" entry.

If the entry is a receive entry, the directive or information of the message stored as the receive entry in the shared memory is processed (block 364) by the controller 110n. The processing of information from the CPU 104 in a message of a receive entry may include forwarding the information to an external source 225 such as an administrator workstation. Upon processing the stored receive entry, the receive entry may be deleted from the shared memory or otherwise marked as processed. In addition, processing of the shared memory entries may skip (block 366) to the next entry, if any, of the shared memory 232. If it is determined (block 368) that there are no remaining entries to be processed, operations of the controller 110n may resume as provided in the example of FIG. 7. Conversely, if it is determined that additional shared memory entries remain to be processed, the next entry may be read (block 360) and processed as appropriate.

If it is determined (block 362) that a read entry is intended for the CPU 104, that is, the entry is a "send" entry, processing of the shared memory entries may again skip (block 366) to the next entry, if any, of the shared memory 232.

Set forth is one example of coding for one example of a shared memory:

```
typedef struct {
    UINT32      EntryLength;    // Length in bytes of MAILBOX_ENTRY
    BOOLEAN     Send;           // TRUE =Send, FALSE = Receive
    CMD_TYPE    Command;
} MAILBOX_ENTRY;
typedef struct {
    UINT64          MailBoxEntryCount   // How many MAILBOX_ENTRY members
    //LBA_ENTRY MailBoxArray[];         //Array follows MAILBOX_DESCRIPTOR
} MAILBOX_DESCRIPTOR;
```

It is appreciated of course that other coding and other structures may be utilized.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a trans mission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any suitable information bearing medium.

The described operations may be performed by circuitry, where "circuitry" refers to either hardware or software or a combination thereof. The circuitry for performing the operations of the described embodiments may comprise a hardware device, such as an integrated circuit chip, Programmable Gate Array, Application Specific Integrated Circuit, etc. The circuitry may also comprise a processor component, such as an integrated circuit, and code in a computer readable medium, such as memory, wherein the code is executed by the processor to perform the operations of the described embodiments.

The term packet was used in the above description to refer to a packet conforming to a network communication protocol. However, a packet may also be a frame, fragment, ATM cell, and so forth, depending on the network technology being used. Alternatively, a packet may refer to a unit of data transferred from devices other than network devices, such as storage controllers, printer controllers, etc. In such alternative implementations, the key from the header for such alternative packets may include information that is not related to the transmission of a packet over a network.

The illustrated embodiments an operating system 118, an out-of-band controller 110n, a remote chassis 150 and a shared memory 232. It is appreciated that other embodiments may include more than one of these components. For example, one out-of-band controller 110n may be associated with many operating systems or many remote chassis 150 or many shared memories 232 in a particular computer system. As another example a remote chassis 150 may be part of a second computer system similar to the host computer 102 and include its own out-of-band controller 110n.

In the illustrated embodiment, the controller 110n has been described as an out-of-band controller. It is appreciated that the controller 110n may, in certain applications, be provided by an in-band controller, the operations of which may be more closely dependent upon the status of the system processor, depending upon the particular application.

The illustrated operations of FIGS. 2-9 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

In the described embodiments, certain operations were described as being performed by the operating system 118, system host 112, device driver 120, or the I/O devices 110a ... 110, 113a ... 113n. In alterative embodiments, operations described as performed by one of these may be performed by one or more of the operating system 118, device driver 120, or an I/O device 110a ... 110, 113a ... 113n. For example, data transmission operations described as being performed by the driver may be performed by the host. In the described embodiments, a transport protocol layer was embodied in the I/O device 110n hardware. In alternative embodiments, one or more of these protocol layer may be embodied in the device driver 120 or operating system 118.

In certain embodiments, the device driver and controller embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative embodiments, the network controller embodiments may be included in a system that does not include a storage controller, such as certain hubs and switches.

In certain embodiments, the device driver and controller embodiments may be embodied in a computer system including a video controller to render information to display on a monitor coupled to the computer system including the device driver and network controller, such as a computer system comprising a desktop, workstation, server, mainframe, laptop, handheld computer, etc. Alternatively, the controller and device driver embodiments may be embodied in a computing device that does not include a video controller, such as a switch, router, etc.

Figure 10:
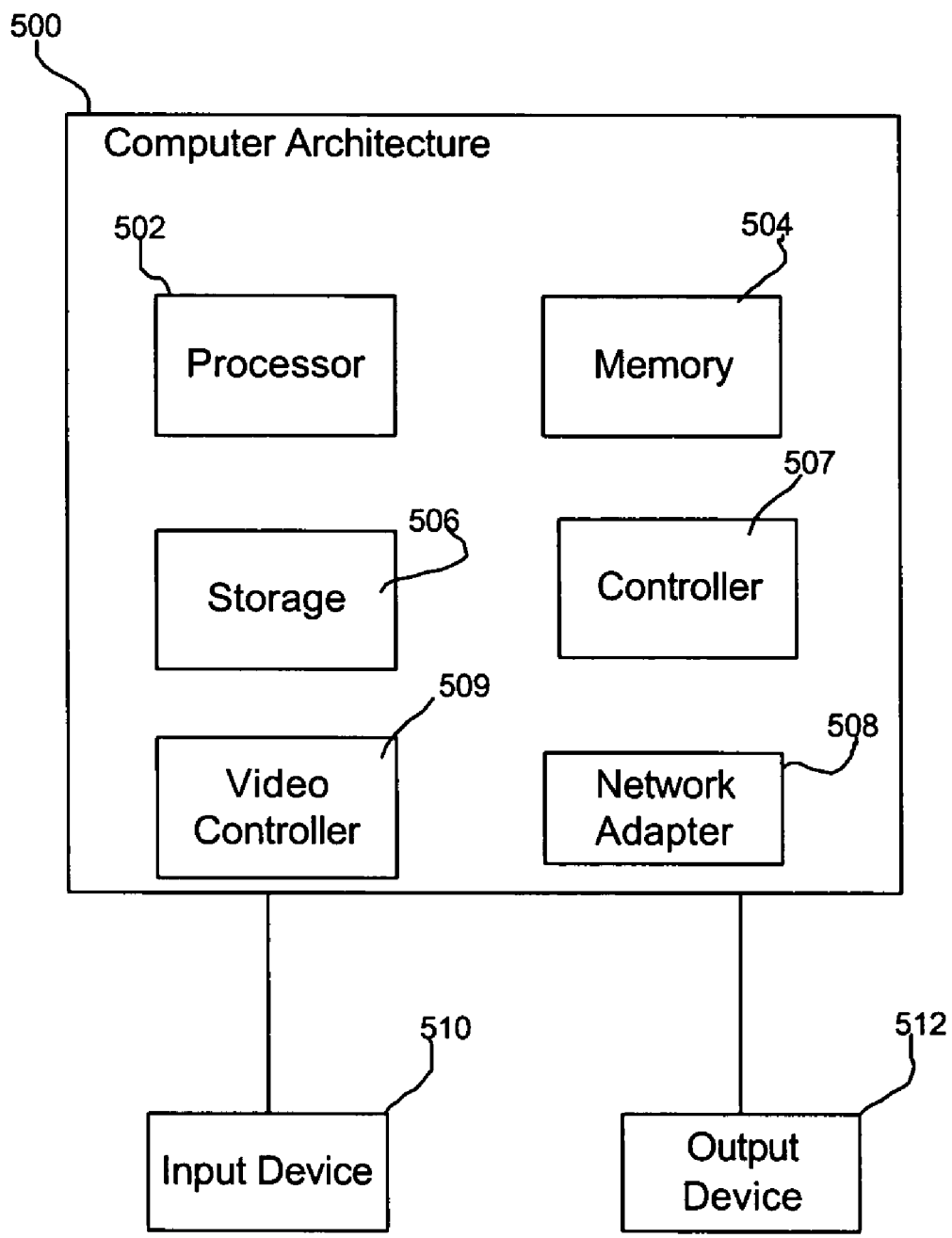
FIG. 10 illustrates an example of an architecture which may be used with described embodiments.

FIG. 10 illustrates one embodiment of a computer architecture 500 of a host computer to be coupled to a remote chassis such as the chassis 150. The architecture 500 may include a system processor 502 (e.g., a microprocessor), a memory 504 (e.g., a volatile memory device), storage 506 (e.g., a non-volatile storage, such as magnetic disk drives, optical disk drives, a tape drive, etc.) and a controller 507 such as an out-of-band controller. The storage 506 may comprise an internal storage device or an attached or network accessible storage. Programs in the storage 506 are loaded into the memory 504 and executed by the system processor 502 in a suitable manner. The architecture further includes a network controller 508 to enable communication with a network, such as an Ethernet, a Fibre Channel Arbitrated Loop, etc. Further, the architecture may, in certain embodiments, include a video controller 509 to render information on a display monitor, where the video controller 509 may be embodied on a video card or integrated on integrated circuit components mounted on the motherboard. As discussed, certain of the network devices may have multiple network cards or controllers. An input device 510 is used to provide user input to the system processor 502, and may include a keyboard, mouse, pen-stylus, microphone, touch sensitive display screen, or any other suitable activation or input mechanism. An output device 512 is capable of rendering information transmitted from the system processor 502, or other component, such as a display monitor, printer, storage, etc. The controller 507 may embodied on a network card, such as a PCI card, or some other I/O card, or on integrated circuit components mounted on the motherboard.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

operating a controller to store a first message containing a directive in a memory shared by said controller and a processor of a computer system which includes an operating system maintained in a memory coupled to said processor, and a bus coupling said shared memory to said processor and said controller;

operating said processor to read said first message in said shared memory and to process said directive of said first message wherein said processing said directive of said first message includes storing a second message in said shared memory; and operating said controller to read said second message in said shared memory and to process said second message;

wherein said controller is operated independently of the state of said processor and said operating system, such that there is no communication between said controller and said processor outside of messages stored in said shared memory.

2. The method of claim 1 wherein said directive of said first message includes a directive to update selected software of said computer system.

3. The method of claim 2 wherein said directive of said first message includes a directive to update a driver of said operating system.

4. The method of claim 2 wherein said directive of said first message includes a directive to update antivirus software of said computer system.

5. The method of claim 1 wherein said directive of said first message includes a directive to update firmware of a device of said computer system.

6. The method of claim 1 wherein said second message includes status information describing a component of the computer system and wherein said processing of said directive of said second message includes forwarding said status information over a network to a second computer system.

7. The method of claim 1 further comprising marking said first message as a message to be read and processed by said processor.

8. The method of claim 1 further comprising marking said second message to be read and processed by said controller.

9. The method of claim 1 further comprising initializing said processor and booting said computing system including loading said operating system wherein said operating said processor to read said first message in said shared memory and to process said directive of said first message occurs prior to said loading said operating system.

10. The method of claim 9 further comprising operating said processor to read another message in said shared memory and to process a directive of said other message after loading said operating system.

11. The method of claim 1 further comprising receiving at said controller a directive from a second computer system, wherein said operating said controller to store said first message is in response to receipt of said directive from said second computer system.

12. A computer system, comprising:
a motherboard;
a processor mounted on said motherboard;
a system memory coupled to said processor and adapted to maintain an operating system;
an expansion card coupled to said motherboard;
a controller mounted on said motherboard;
a shared memory; and
a bus coupling said shared memory to said processor and said controller;
wherein said controller is adapted to store a first message containing a directive in said shared memory;
wherein said processor is adapted to read said first message in said shared memory and to process said directive of said first message wherein said processing said directive of said first message includes storing a second message in said shared memory;
wherein said controller is adapted to read said second message in said shared memory and to process said second message; and
wherein said controller is operated independently of the state of said processor and said operating system, such that there is no communication between said controller and said processor outside of messages stored in said shared memory.

13. The system of claim 12 further comprising software wherein said directive of said first message includes a directive to update selected software of said computer system.

14. The system of claim 13 further wherein said operating system includes drivers and wherein said directive of said first message includes a directive to update a driver of said operating system.

15. The system of claim 13 further comprising antivirus software and wherein said directive of said first message includes a directive to update antivirus software of said computer system.

16. The system of claim 12 further comprising a device having firmware and wherein said directive of said first message includes a directive to update firmware of a device of said computer system.

17. The system of claim 12 for use with a second computer system and a network wherein said computer system further comprises a component and wherein said controller is adapted to be coupled to said second computer system by said network, and wherein said second message includes status information describing a component of the computer system and wherein in processing of said directive of said second message, said controller is adapted to forward said status information over said network to said second computer system.

18. The system of claim 17 wherein said controller is adapted to receive a directive from said second computer system, and to store said first message in response to receipt of said directive from said second computer system.

19. The system of claim 12 wherein said controller is further adapted to mark said first message as a message to be read and processed by said processor.

20. The system of claim 12 wherein said processor is further adapted to mark said second message to be read and processed by said controller.

21. The system of claim 12 wherein said processor is further adapted to initialize said processor and boot said system including loading said operating system, and to read said first message in said shared memory and to process said directive of said first message prior to said loading of said operating system.

22. The system of claim 21 wherein said processor is further adapted to read another message in said shared memory and to process a directive of said other message after loading said operating system.

23. A controller for use with a first computer having a processor, a system memory coupled to said processor, an operating system stored in said system memory, a shared memory, and a bus adapted to couple said shared memory to said processor and said controller; said controller comprising:
logic adapted to store a first message containing a directive in said shared memory;
wherein said processor is adapted to read said first message in said shared memory and to process said directive of said first message wherein said processing said directive of said first message includes storing a second message in said shared memory; and
said logic is further adapted to read said second message in said shared memory and to process said second message;
wherein said controller is operated independently of the state of said processor and said operating system, such that there is no communication between said controller and said processor outside of messages stored in said shared memory.

24. The controller of claim 23 wherein said first computer further has software and wherein said directive of said first message includes a directive to update selected software of said first computer.

25. The controller of claim 24 wherein said operating system includes drivers and wherein said directive of said first message includes a directive to update a driver of said operating system.

26. The controller of claim 24 wherein said first computer includes antivirus software and wherein said directive of said first message includes a directive to update antivirus software of said first computer.

27. The controller of claim 23 wherein said first computer includes a device having firmware and wherein said directive of said first message includes a directive to update firmware of a device of said first computer.

28. The controller of claim 23 wherein said first computer includes a component and wherein said controller is further for use with a second computer and a network and wherein said controller is adapted to be coupled to said second computer by said network, and wherein said second message includes status information describing a component of the first computer and wherein in processing of said directive of said second message, said logic of said controller is adapted to forward said status information over said network to said second computer.

29. The controller of claim 28 wherein said logic of said controller is further adapted to receive a directive from said second computer, and to store said first message in response to receipt of said directive from said second computer.

30. The controller of claim 23 wherein said logic of said controller is further adapted to mark said first message as a message to be read and processed by said processor.

31. An article for use with a first computer having a processor, a system memory coupled to said processor, an operating system stored in said system memory, a shared memory, a controller, and a bus coupling said shared memory to said processor and said controller; said article comprising a storage medium, the storage medium comprising machine readable instructions stored thereon to:
    operate said controller to store a first message containing a directive in said shared memory;
    wherein said processor is adapted to read said first message in said shared memory and to process said directive of said first message wherein said processing said directive of said first message includes storing a second message in said shared memory; and
    operate said controller to read said second message in said shared memory and to process said second message;
    wherein said controller is operated independently of the state of said processor and said operating system, such that there is no communication between said controller and said processor outside of messages stored in said shared memory.

32. The article of claim 31 wherein said first computer includes software and wherein said directive of said first message includes a directive to update selected software of said first computer.

33. The article of claim 32 wherein said operating system includes drivers and wherein said directive of said first message includes a directive to update a driver of said operating system.

34. The article of claim 32 wherein said first computer includes antivirus software and wherein said directive of said first message includes a directive to update antivirus software of said first computer.

35. The article of claim 31 wherein said first computer includes a device having firmware and wherein said directive of said first message includes a directive to update firmware of a device of said first computer.

36. The article of claim 31 wherein said first computer includes a component and wherein said article is further for use with a second computer wherein said controller is adapted to be coupled to said second computer by a network, and wherein said second message includes status information describing a component of the first computer and wherein the storage medium further comprises machine readable instructions stored thereon to:
    in processing of said directive of said second message, forward said status information over said network to said second computer.

37. The article of claim 36 wherein the storage medium further comprises machine readable instructions stored thereon to:
    receive a directive from said second computer, and to store said first message in response to receipt of said directive from said second computer.

38. The article of claim 31 wherein the storage medium further comprises machine readable instructions stored thereon to:
    mark said first message as a message to be read and processed by said processor.

* * * * *